US007660286B2

(12) United States Patent
Passarella et al.

(10) Patent No.: US 7,660,286 B2

(45) Date of Patent: Feb. 9, 2010

(54) JITTER MANAGEMENT FOR PACKET DATA NETWORK BACKHAUL OF CALL DATA

(75) Inventors: Rossano Passarella, Mukilteo, WA (US); Jayesh Sukumaran, Woodinville, WA (US); Donald P. Wahlstrom, Woodinville, WA (US); Yan Zhang, Bellevue, WA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/516,677

(22) Filed: Sep. 5, 2006

(65) Prior Publication Data

US 2007/0183378 A1 Aug. 9, 2007

Related U.S. Application Data

(60) Provisional application No. 60/765,264, filed on Feb. 3, 2006.

(51) Int. Cl.
*H04Q 11/04* (2006.01)

(52) U.S. Cl. ....................... 370/338; 370/235; 370/286; 370/335; 370/352; 370/412; 379/220.01; 455/414.1; 455/435.1

(58) Field of Classification Search ................. 370/431, 370/235, 338, 429, 286, 335, 352, 412; 379/67.1, 379/220.01; 455/411, 414.1, 435.1; 709/224
See application file for complete search history.

(56) References Cited

U.S. PATENT DOCUMENTS 5,434,854 A * 7/1995 Focarile et al. .............. 370/335
5,608,725 A * 3/1997 Grube et al. ................ 370/338
5,940,751 A * 8/1999 Kaplan et al. ............... 455/411
5,991,639 A * 11/1999 Rautiola et al. .......... 455/414.1
6,078,566 A * 6/2000 Kikinis ....................... 370/286
6,078,575 A * 6/2000 Dommety et al. ........... 370/338
6,747,953 B1 * 6/2004 Qureshi et al. ............. 370/235
6,961,327 B2 * 11/2005 Niu ........................... 370/338
7,023,803 B2 * 4/2006 Kakani et al. .............. 370/235
7,099,346 B1 * 8/2006 Kanterakis ................. 370/431
7,221,941 B2 * 5/2007 Seon ....................... 455/435.1
7,228,348 B1 * 6/2007 Farley et al. ................ 709/224
7,313,149 B2 * 12/2007 Deleam et al. ............. 370/429
2002/0064169 A1 * 5/2002 Gummalla et al. .......... 370/412
2007/0183377 A1 * 8/2007 Hoole et al. ................ 370/338

FOREIGN PATENT DOCUMENTS

GB 2 372 172 A 8/2002

OTHER PUBLICATIONS

Andrew S. Tanenbaum: "Computer Networks—forth edition" 2003, Pearson Education International, Upper Saddle River, NJ, USA, XP002519788, pp. 391-396.

(Continued)

*Primary Examiner*—Gerald Gauthier
(74) *Attorney, Agent, or Firm*—McAndrews, Held & Malloy, Ltd.

(57) ABSTRACT

Managing packet data network jitter is disclosed. A first call data associated with a mobile network communication session is received. A second call data that is older than the first call data is dropped from a buffer if required to make room in the buffer for the first call data.

29 Claims, 5 Drawing Sheets

OTHER PUBLICATIONS

Papayiannis S et al.: "Implications of proactive datagram caching on TCP performance in wireless/mobile communications," Computer Communications, Elsevier Science Publishers BV, Amsterdam, NL, vol. 26, No. 2, Feb. 1, 2003, pp. 79-89, XP004401225 ISSN: 0140-3664.

* cited by examiner

JITTER MANAGEMENT FOR PACKET DATA NETWORK BACKHAUL OF CALL DATA

CROSS REFERENCE TO OTHER APPLICATIONS

This application claims priority to U.S. Provisional Patent Application No. 60/765,264 entitled JITTER MANAGEMENT FOR PACKET DATA NETWORK BACKHAUL OF CALL DATA filed Feb. 3, 2006, which is incorporated herein by reference for all purposes.

BACKGROUND OF THE INVENTION

Traditionally mobile network base transceiver stations (BTS) have exchanged data with the core mobile network via a dedicated, high capacity connection to an associated base station controller (BSC), e.g., a dedicated T-1/E-1 line. In some cases, it may be desirable to use an IP or other packet data network to enable a BTS to exchange data with a BSC. However, to meet quality of service obligations to carriers and/or provide a satisfactory call experience to users, care must be taken to ensure call data is communicated in an efficient manner that ensures safe and timely receipt at the destination.

One challenge faced when transmitting call data between a base transceiver station and a base station controller via a packet data network is that transmission times across such networks may vary over the short term, e.g., due to variations in the volume of network traffic being sent at a particular time; changing environmental, workload, or other conditions affecting one or more nodes in the network path; singular and/or periodic events that affect the availability and/or speed of one or more nodes; etc. This characteristic of packet data networks, known as "jitter", makes it difficult or often impossible to predict with certainty the time it will take for a given packet sent by a sending node to reach its destination. However, typically a mobile telecommunication protocol requires that a packet be transmitted at a prescribed interval (e.g., one every 20 msec in the case of GSM), and it would not be desirable to propagate network jitter to call data destinations, which could result in audible manifestations perceived by a user, such as by garbling or "breaking up" call voice data. Therefore, there is a need for a way to manage the effect of jitter on a packet data network used to transport mobile network data.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Jitter management for packet data network backhaul of call data is disclosed. In some embodiments, a jitter management buffer is provided. Call data packets or frames are not pulled from the buffer until it has reached a prescribed minimum depth and/or a prescribed length of time. In some embodiments, the buffer is not filled beyond a prescribed maximum depth, to avoid accumulating network transport delays. As packets are received they are placed in the buffer, in sequence, if there is room, or if the buffer is full either one or more received packets are dropped instead of being added to the buffer (e.g., if they arrived too early or too late) or one or more packets in the buffer are purged (e.g., if they were received more than a prescribed amount of time ago and/or a subsequently received packet is neither too late nor too early). By enforcing a maximum depth and only beginning (or in some embodiments resuming after buffer depletion) transmission after the buffer has filled to a minimum depth/reached a prescribed time, network jitter is managed without introducing an undesirable amount of delay in the receipt of call data at the destination equipment. In some cases, the call data includes packet data such as GPRS data.

Figure 1:
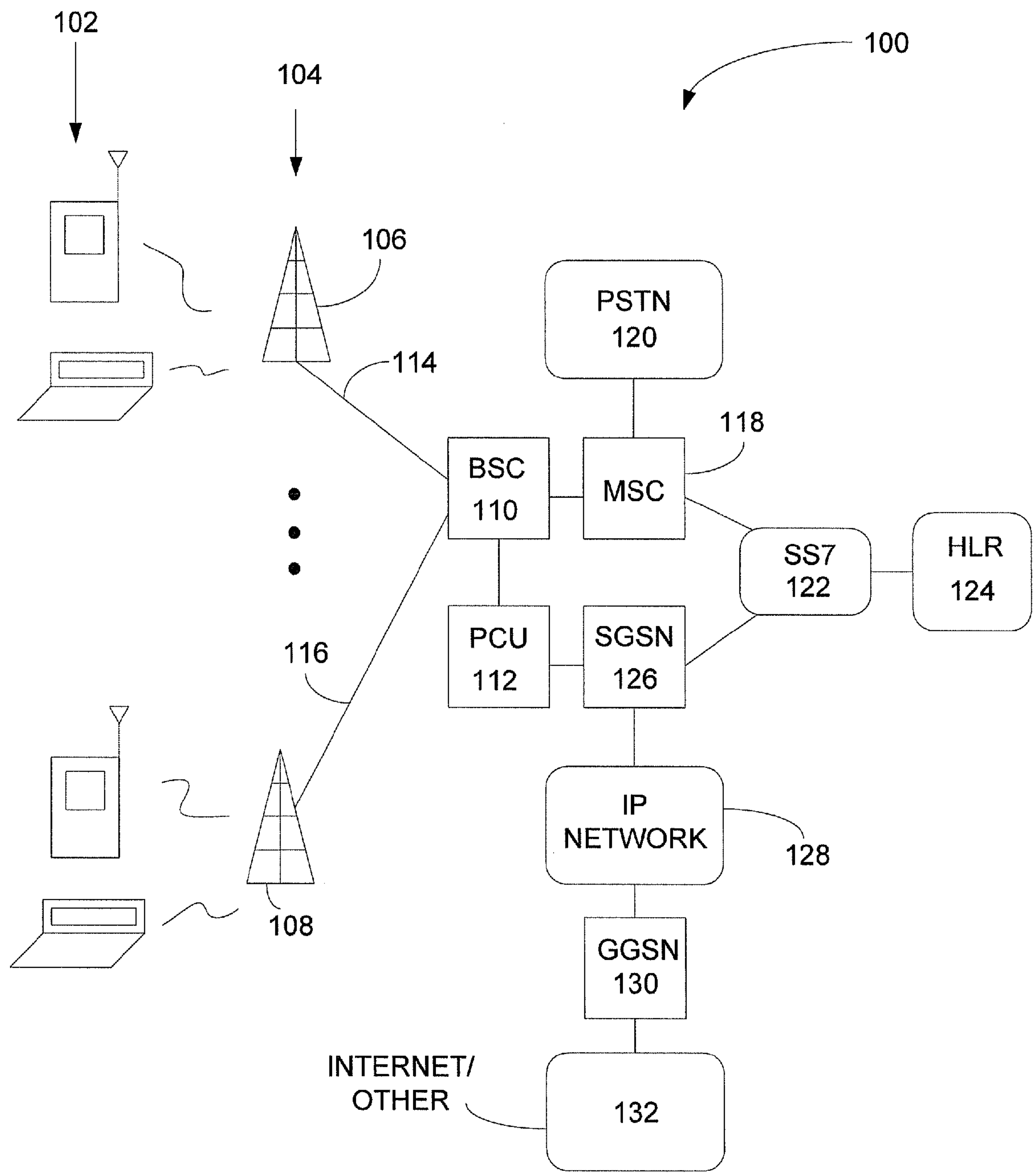
FIG. 1 is a block diagram illustrating elements of a typical GSM network.

FIG. 1 is a block diagram illustrating elements of a typical GSM network. In the example shown, GSM network 100 includes a plurality of mobile devices 102 connected via base transceiver stations 104, represented in FIG. 1 by BTS 106 and BTS 108, to a base station controller (BSC) 110. The BSC 110 has a packet control unit 112 associated with it, for handling non-voice network data communication (e.g., GPRS) packets. The BTS's are connected to the BSC via Abis links 114 and 116, respectively. The Abis interface is a standards-based interface that typically includes one or more elements and/or requirements that are specific and typically proprietary to an original equipment manufacturer (OEM) and/or other vendor of the BSC. Typically, the Abis interface/link is carried over a dedicated and private T-1/E-1 line. In the example shown, the BSC 110 is connected to a mobile switching center 118, to which the BSC 110 is configured to route inbound voice data received from mobile equipment via a BTS and from which the BSC 110 is configured to receive outbound voice data. The MSC 118 connects to traditional telephone equipment and other networks via the public switched telephone network (PSTN) 120. The MSC 118 is connected via an SS7 (or other) network 122 to a home location register (HLR) 124 used to store subscriber data. To handle non-voice packet (e.g., GPRS) data, the PCU 112 is connected to an SGSN 126. In the example shown SGSN 126 is connected via SS7 network 122 to HLR 124. SGSN 126 is also connected via an IP network 128 and a GGSN 130 to the Internet (or other external packet data network) 132.

Figure 2:
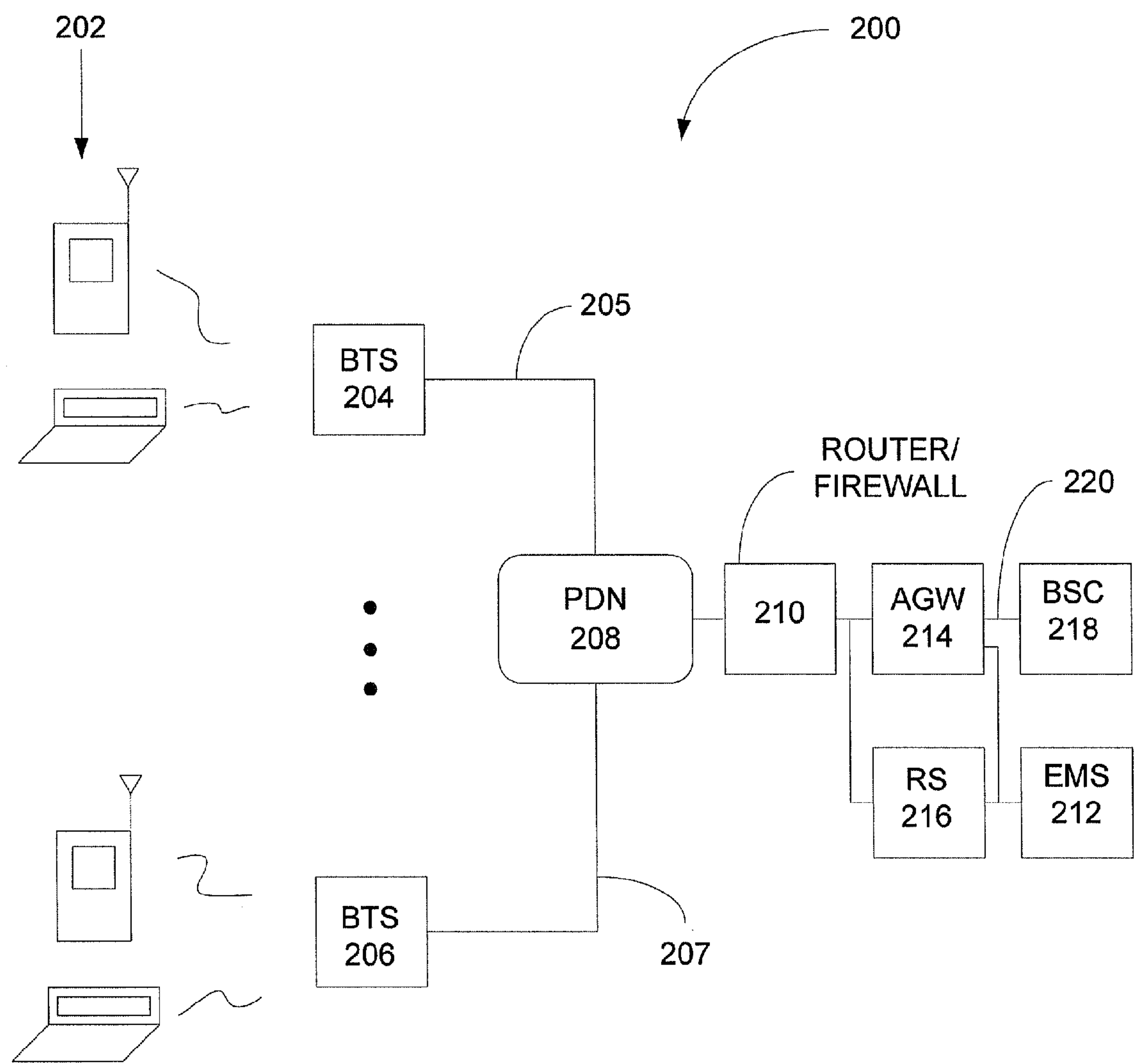
FIG. 2 is a block diagram illustrating an embodiment of a mobile network with packet data network backhaul.

FIG. 2 is a block diagram illustrating an embodiment of a mobile network with packet data network backhaul. In the example shown, the mobile network 200 includes mobile equipment 202 connected to a plurality of base transceiver stations represented in FIG. 2 by BTS 204 and BTS 206. BTS 204 and BTS 206 are connected via a local Internet access connection 205 and 207, respectively, to a packet data network (PDN) 208, such as the Internet. In some embodiments, mobile network data is sent, via PDN 208, between the base transceiver stations represented by BTS 204 and BTS 206, on the one hand, and AGW 214, on the other, using the Internet (IP) protocol. In various embodiments, Internet access connections 205 and 207 comprise a cable, DSL, or other modem collocated with the BTS and/or a local exchange carrier central office (LEC-CO) with DSLAM or cable head-end. Also connected to PDN 208 in the example shown in FIG. 2 is a router/firewall 210 connected to and configured to provide connectivity to and security with respect to an aggregation gateway 214, and a registration server 216. In some embodiments, element management server EMS 212 is connected to router/firewall 210. In some embodiments, router/firewall 210 is omitted and/or does not include a firewall. In various embodiments, element management server 212, an aggregation gateway 214, and a registration server 216 are included in one or more physical computing systems. Element management server 212 enables an administrator to perform operational, administrative, and/or management (OAM) operations with respect to one or more mobile network elements, e.g., BTS 204 or BTS 206. Aggregation gateway (AGW) 214 receives inbound mobile network data (voice, signaling, data, control/management) from one or more base transceiver stations (BTS), via PDN 208, aggregates data from two or more base transceiver stations (if/as applicable), and provides the inbound data to BSC 218 via one or more physical ports, using time division multiplex (TDM) as prescribed by the GSM standard and the BSC OEM's proprietary implementation of the Abis interface 220. In some embodiments, the AGW 214 is capable of interfacing with more than one type of BSC, e.g., with BSC's from two or more vendors. In some such embodiments, the AGW 214 is configured and/or provisioned, e.g., at deployment time, to use the Abis interface API of the particular type of BSC with which it is required to communicate in a particular installation. In some embodiments, an API or other interface specification or definition of the Abis interface as implemented by each BSC vendor/OEM the AGW is desired to be able to support is obtained and used as applicable to configure/provision the AGW to communicate with a particular BSC with which it is required to communicate. In some embodiments, BSC 218 is connected to a PCU, such as PCU 112 of FIG. 1. In some embodiments, AGW 214 is connected to a PCU. For example, BSC 218 is optional, and AGW 214 directly connected to a PCU.

In some embodiments, AGW 214 is configured to present two or more physical base transceiver stations to the BSC as a single logical BTS, to more efficiently use BSC resources in situations in which each BTS serves a relatively small service area and/or number of users. In some embodiments, AGW 214 is configured to map communications received from the BSC to the correct physical BTS and conversely to map communications received from two or more physical base transceiver stations to a single logical BTS prior to forwarding such inbound communications to the BSC.

Registration server 216 is configured to be used to register a BTS and/or other provider equipment with the network, e.g., to authenticate the equipment prior to providing to the equipment session keys to be used in secure communication protocols, identifying (e.g., address) information for other network elements, such as AGW 214, etc.

Each BTS in the mobile network 200 shown in FIG. 2 in some embodiments handles only a small fraction of the call volume/load of a conventional BTS, and in such embodiments AGW 214 promotes more efficient use of limited BSC resources. For example, in some embodiments AGW 214 aggregates data associated with multiple base transceiver stations and provides communication to/from the BSC via a fewer number of physical BSC ports (e.g., a single port). In various embodiments, use of PDN 208 and AGW 214 to transport data between base transceiver stations such as BTS 204 and BTS 206, on the one hand, and BSC 218, on the other, makes it commercially feasible to provide a small from factor and/or relatively low capacity BTS for use in remote (e.g., rural) service areas and/or to provide dedicated service to individuals and/or relatively small groups of users, such as a household or small business, since in addition to not requiring a BSC port for each BTS a dedicated T-1/E-1 line is not required.

While the example shown in FIG. 2 and in other embodiments described herein involves a GSM network and/or uses GSM nomenclature to refer to network elements, the techniques described herein are applied in other embodiments to other types of mobile telecommunications networks, and in particular may be applied wherever a plurality of relatively low capacity base transceiver stations need to exchange mobile communication data with a base station controller or other node having a limited number of relatively very high capacity ports or other resources.

Figure 3:
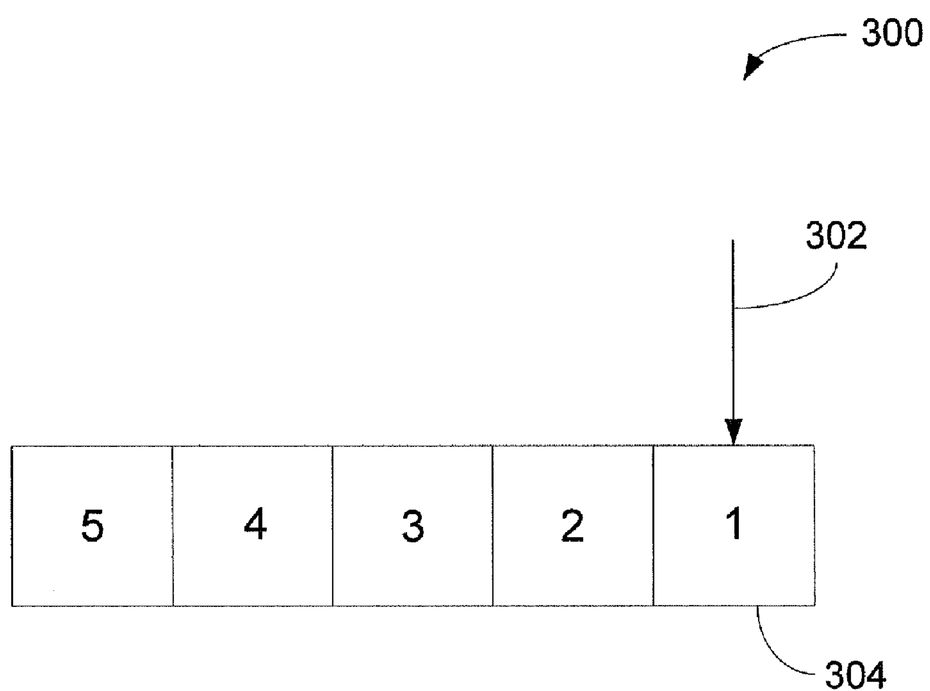
FIG. 3 is a block diagram illustrating an embodiment of a jitter management buffer.

FIG. 3 is a block diagram illustrating an embodiment of a jitter management buffer. In some embodiments, the jitter management buffer 300 of FIG. 3 is used to ensure that jitter, i.e., fluctuations or variations in network transmission delay in an IP or other packet data network used to transport call data between a base transceiver station such as BTS 204 of FIG. 2 and a base stations controller and/or associated aggregation gateway, such as BSC 218 and/or AGW 214 of FIG. 2, is not propagated. As packets are received via the IP network, e.g., in some embodiments in the form of an Real-time Transport Protocol (RTP) packet in which call data for multiple channels, e.g., multiple TDMA slots, have been bundled in a single packet with one RTP header, call data is extracted and placed in a jitter management buffer such as jitter management buffer 300. In the example shown, the buffer 300 has five positions, indicating that in this example the maximum number of call data packets that will be held in the buffer is five. As call data are extracted from the packet used to transport them (e.g., RTP via UDP over IP), the call data is associated with a call session, channel, and/or slot with which it is associated and is placed in the buffer in a position/order indicated by a call data sequence number, e.g., an RTP or other sequence number, associated with the data. In some embodiments, arriving call data is dropped if it arrives too early and the buffer is full, if it arrives too late to be currently relevant/useful, and/or if it arrives out of order as described more fully below. A call data player (or reader) 302 pulls a call data packet/frame from the first buffer position 304 and transmit it, via the air link in the case of outbound call data received at a BTS for transmission to a mobile equipment and via the Abis interface to the BSC in the case of inbound call data received at an AGW, for example, on a schedule determined or set by standard, OEM specification, and/or otherwise, e.g., once every 20 msec in the case of GSM. In various embodiments, player 302 is a process running on the receiving end that pulls packets and causes them to be transformed as required and transmitted to their next and/or final destination.

In some embodiments, startup player 302 does not begin pulling call data from the buffer until a prescribed minimum number of buffer positions contain call data, e.g., three packets in some embodiments. In some embodiments, startup player 302 pulls call data from the buffer if a prescribed time has been reached even though a prescribed minimum number of buffer positions do not contain call data. In some embodiments, if the jitter management buffer is depleted, the player 302 stops pulling packets from the buffer and does not resume until the minimum startup depth is achieved again. In this manner, jitter in the IP and/or other packet data network is not propagated to mobile network elements on either side of the IP and/or other packet data network transmission path. In some embodiments, the maximum buffer depth is bounded, in this example to five packets, to avoid accumulating delays in the arrival of call data, as would occur, for example, if a slug of packets arrived in rapid succession after an interruption and/or change in the network topography and/or if the clocks on the sending and receiving ends were out of synch, e.g., such that four packets were being sent to the BTS in the period in which only three were being pulled from the buffer to be transmitted. In some embodiments, failure to enforce a maximum buffer depth could lead to very stale call data being transmitted. In some embodiments, if the buffer is full, an algorithm is used to determine which call data packets to drop, as described more fully below.

In some embodiments, buffer 300 is not associated with a maximum buffer depth, and one or more packets that were added to the buffer may be dropped from the buffer when startup player 302 pulls call data from the buffer. In some embodiments, the buffer may contain more data than the amount data that can be transmitted at transmission time. Only a portion of data in the buffer may be transmitted at transmission time. In some embodiments, buffer 300 is a queue. In some embodiments, buffer 300 is a circular queue. As new packets are received, they are added to the end of the queue. The queue wraps around so that the position after the last position is the beginning of the queue.

Figure 4:
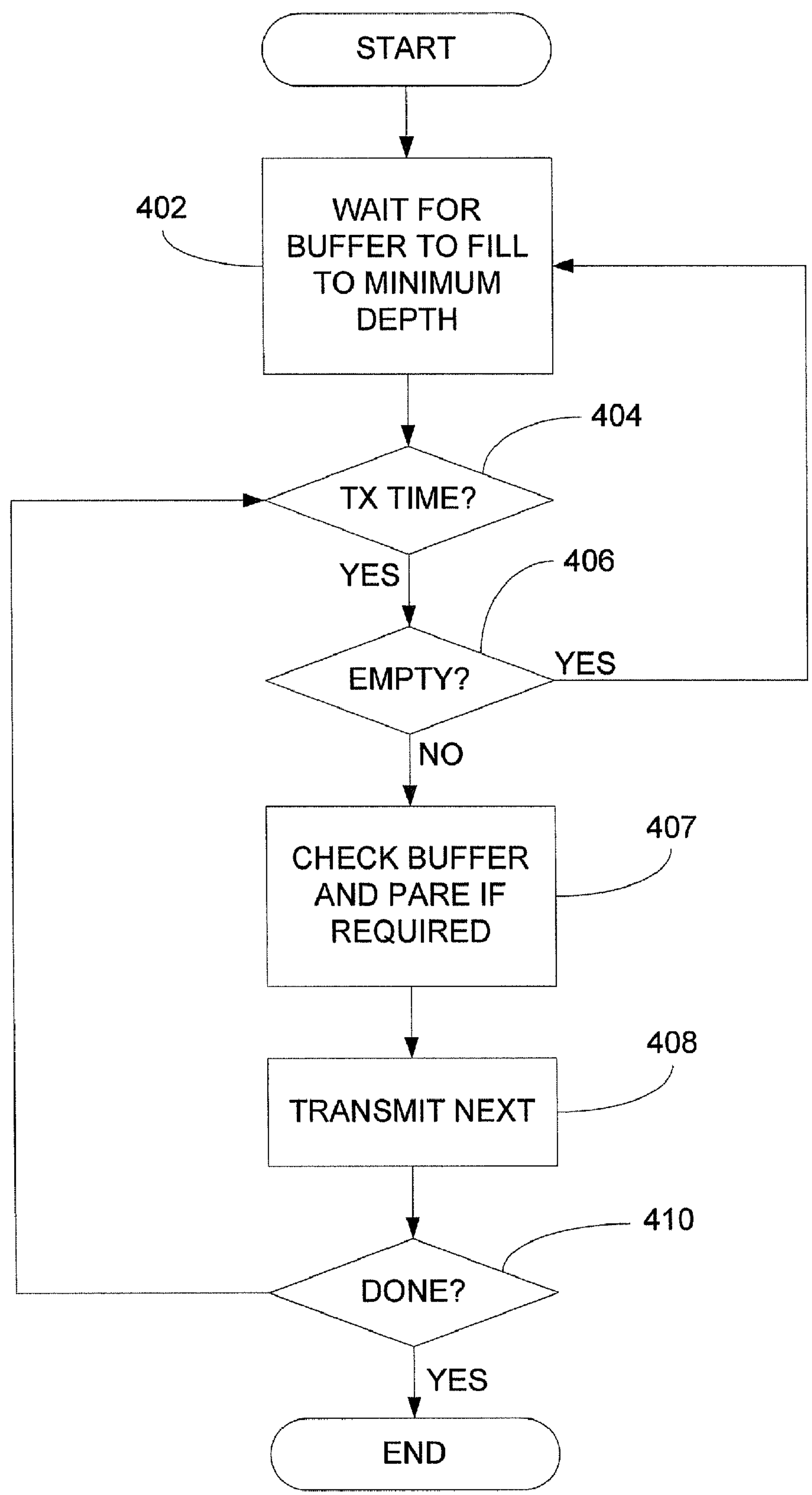
FIG. 4 is a flow chart illustrating an embodiment of a process for pulling and transmitting call data packets/frames from a jitter management buffer.

FIG. 4 is a flow chart illustrating an embodiment of a process for pulling and transmitting call data packets/frames from a jitter management buffer. At startup, or after the buffer has been depleted (406), the process waits for the buffer to fill to its minimum depth (402). In some embodiments, the process does not wait for the buffer to fill to its minimum depth if a prescribed time (e.g., prescribed length of time since the buffer was last empty) has been reached. In some embodiments, the process does not wait for the buffer to fill to its minimum depth if the packets filling the buffer are received in an order associated with the sequence number of the packets. For example, packets arriving in an order associated with the sequence number of the packets may indicate minimal or no jitter is present. Once the buffer has reached its minimum depth (402), at the next transmission time (404), e.g., every 20 msec in the case of GSM, unless the buffer has been depleted (406), the buffer is checked and pared if required. In various embodiments, checking and paring the buffer is optional. A packet may be examined and determined to be drop before and/or after the packet is added to the buffer. For example, a packet is only added to the buffer if it is to be transmitted, and in another example, all received packets are added to the buffer for examination at a later time (e.g., transmission time). Checking and paring the buffer includes analyzing the buffer to determine any packets in the buffer to drop and not transmit. For example, a late packet (a previously transmitted packet is subsequent to a late packet in the buffer) is dropped from transmission. At 408, the next packet in the buffer is pulled and transmitted. Once a packet is transmitted, 402-408 are repeated, as applicable, until the call/session is done (e.g., channel not active, BTS or AGW taken offline, etc.) (410) after which the process ends.

Figure 5:
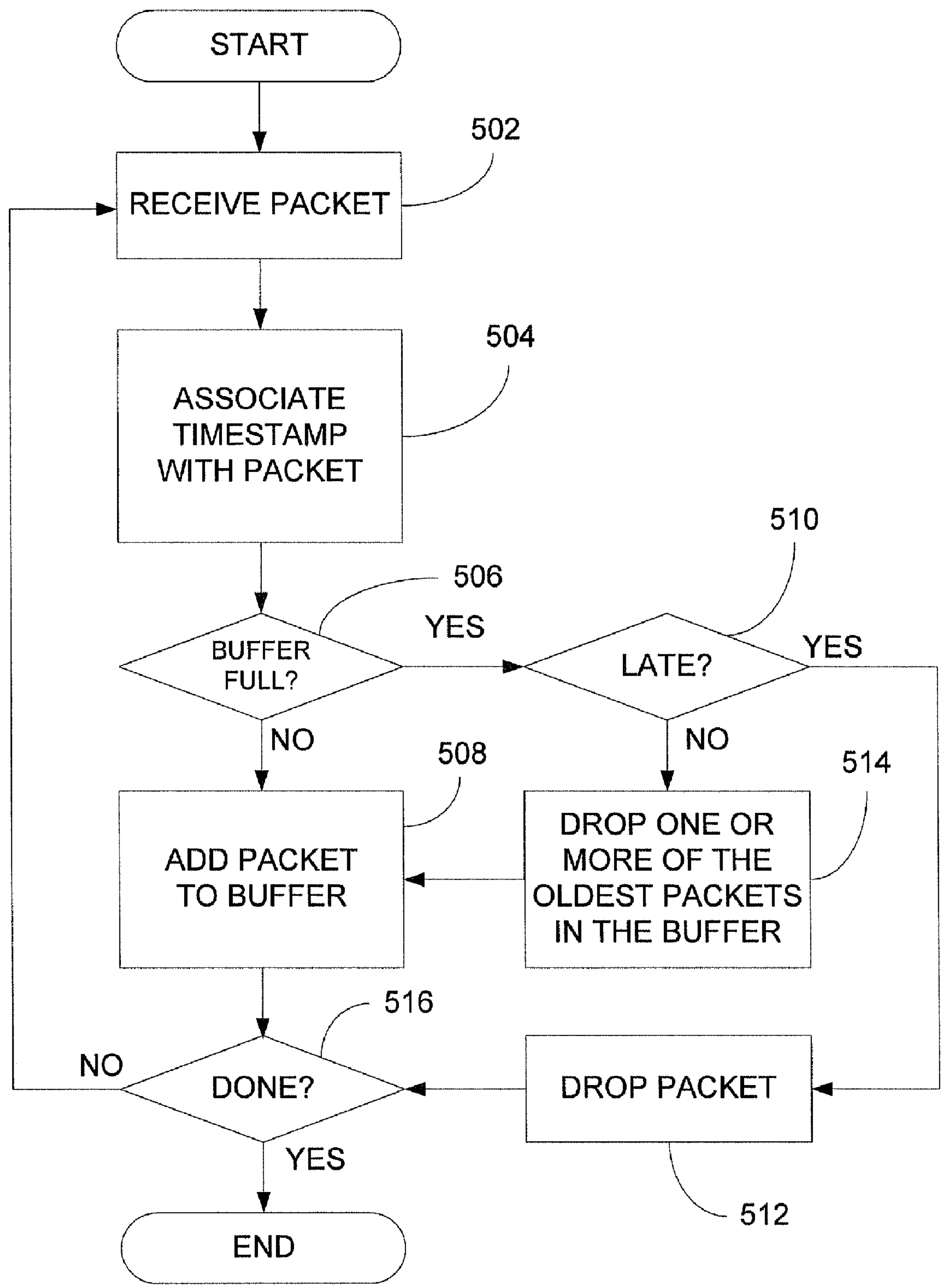
FIG. 5 is a flow chart illustrating an embodiment of a process for receiving call data.

FIG. 5 is a flow chart illustrating an embodiment of a process for receiving call data. In some embodiments, the process of FIG. 5 is implemented as a receive process or algorithm for a jitter management buffer such as buffer 300. In the example shown, when a packet is received (502) a timestamp is associated with it (504). If the buffer is not full (506), i.e., the received packet can be added to it without exceeding a prescribed maximum depth, the received packet is added to the buffer (508). In some embodiments, the packet is added to the buffer in a position corresponding to a sequence number with which the data is associated. If the buffer is full (506), it is determined (e.g., based on the timestamp and/or the sequence number) whether the received packet arrived late (i.e., packets having subsequent sequence numbers have already been transmitted) (510). In some embodiments, if the buffer is full (506), it is determined (e.g., based on the timestamp and/or the sequence number) whether the received packet arrived early (i.e., the buffer is full with still relatively recent call data packets, as determined by comparing their timestamps to a current time and an associated threshold). If the received packet arrived late (510), the received packet is dropped (512); otherwise (510) one or more oldest packets in the buffer are dropped (514) and the received packet is added to the buffer (518). In some embodiments, the number of oldest packets dropped=(buffer maximum depth−buffer minimum depth)+1 are dropped The algorithm described in the preceding sentence ensures that once the received packet has been added to the buffer the buffer depth will be at the minimum level normally required to startup or resume transmitting. By dropping older call data, network delay is not accumulated. In some embodiments, the formula of 514 is not used, and only one oldest packet is dropped. Once the received packet has either been added to the buffer (508) or dropped (512), (502)-(514) are repeated, as applicable, until call data is done being received (e.g., call ends, BTS and/or AGW goes offline, etc.) (516) after which the process ends.

In some embodiments, determining if the buffer is full 506 is optional, and the packet is always added to the buffer 508. By not analyzing the received packets for early/late packets when adding packets to the queue, the received packets can be analyzed at packet play/transmission time (e.g., 407 of FIG. 4) to determine if one or more of the packets in the buffer should be dropped from being played/transmitted.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing packet data network jitter, comprising:

Receiving and storing in a buffer a first call data associated with a mobile network communication session;

dropping from the buffer a second call data that is older than the first call data using a processor if required to make room in the buffer for the first call data; and using a communication interface to transmit the first call data from the buffer to a destination with which the buffer is associated;

wherein dropping the second call data includes deleting or overwriting the second call data without transmitting the second call data to the destination with which the buffer is associated.

2. A method as recited in claim 1, wherein the first data and the second call data comprise packet data network packets.

3. A method as recited in claim 1, wherein the first data and the second call data comprise time division multiplexing frames.

4. A method as recited in claim 1, wherein the second call data that is older than the first call data if the second call data is associated with a first call sequence number preceding a second call sequence number associated with the first call data.

5. A method as recited in claim 1, wherein receiving the first call data includes associating a timestamp with the first call data.

6. A method as recited in claim 5, wherein the timestamp is used to determine whether the first call data or the second call data should be dropped.

7. A method as recited in claim 1, wherein if the first call data was received after another call data has already been transmitted with a first sequence number subsequent to a second sequence number of the first call data, the first call data is dropped and the second call data is not required to be dropped from the buffer.

8. A method as recited in claim 1, wherein the second call data is dropped based at least in part on a determination that the buffer is full.

9. A method as recited in claim 1, wherein the buffer is used to manage jitter associated with transporting the first call data via a packet data network.

10. A method as recited in claim 1, wherein the method is implemented on one or more of the following: a base transceiver station, a base station controller, and an aggregation gateway.

11. A method as recited in claim 1, wherein receiving the first call data includes extracting the first call data from a packet used to transport the first call data.

12. A method as recited in claim 1, further comprising placing the first call data in the buffer in a buffer position determined at least in part by using a sequence number associated with the first call data.

13. A method as recited in claim 12, wherein the sequence number is a Real-time Transport Protocol sequence number.

14. A method as recited in claim 1, wherein dropping from the buffer the second call data includes dropping a number of the oldest call data in the buffer, and the number of the oldest call data dropped is one more than the difference between a maximum depth associated with the buffer and a minimum depth associated with the buffer.

15. A method as recited in claim 1, wherein the buffer comprises a queue.

16. A method of managing packet data network jitter, comprising:

waiting for a buffer to fill to a prescribed depth with call data; and using a communication interface to transmit a next call data from the buffer to a destination with which the buffer is associated, once the buffer has filled to the prescribed depth;

wherein the prescribed depth comprises a prescribed number of units of call data, each unit occupying a corresponding location in the buffer.

17. A method as recited in claim 16, wherein if a prescribed transmission time has been reached, the next call data is transmitted without waiting for the buffer to be filled to the prescribed depth.

18. A method as recited in claim 16, wherein if call data filling the buffer are received in a sequence number order, a next call data that is next in the sequence number order is transmitted to the destination at a prescribed interval without waiting for the buffer to be filled to the prescribed depth.

19. A method as recited in claim 16, wherein the buffer is not filled beyond a maximum depth.

20. A method as recited in claim 16, wherein call data in the buffer are transmitted until the buffer is depleted.

21. A method as recited in claim 20, wherein the call data are transmitted at a prescribed interval.

22. A method as recited in claim 20, wherein when the buffer is depleted, call data in the buffer is not transmitted until the buffer has filled back to the prescribed depth.

23. A method as recited in claim 16, wherein after waiting for the buffer to fill to the prescribed depth with call data, call data in the buffer are analyzed to determine whether any call data in the buffer should be dropped.

24. A method as recited in claim 16, wherein a late call data in the refilled buffer is dropped from the buffer.

25. A method as recited in claim 24, wherein the late call data is determined to be late based at least in part on a determination that the late call data is associated with a sequence number preceding a sequence number of an already transmitted call data.

26. A system for managing packet data network jitter, comprising:

a communication interface configured to receive and store in a buffer a first call data associated with a mobile network communication session; and a processor configured to drop from the buffer a second call data that is older than the first call data if required to make room in the buffer for the first call data;

wherein dropping the second call data includes deleting or overwriting the second call data without transmitting the second call data to a destination with which the buffer is associated;

wherein the communication interface is configured to transmit the first call data from the buffer to the destination with which the buffer is associated.

27. A system for managing packet data network jitter, comprising:

a processor configured to wait for a buffer to fill to a prescribed depth with call data; and a communication interface configured to transmit a next call data from the buffer to a destination with which the buffer is associated, once the buffer has filled to the prescribed depth;

wherein the prescribed depth comprises a prescribed number of units of call data, each unit occupying a corresponding location in the buffer.

28. A computer program product managing packet data network jitter, the computer program product comprising a tangible computer readable storage medium on which are stored computer instructions which when executed by a computer cause the computer to perform the steps of:

receiving and storing in a buffer a first call data associated with a mobile network communication session;

dropping from the buffer a second call data that is older than the first call data if required to make room in the buffer for the first call data; and transmitting the first call data from the buffer to a destination with which the buffer is associated:

wherein dropping the second call data includes deleting or overwriting the second call data without transmitting the second call data to the destination with which the buffer is associated.

29. A computer program product managing packet data network jitter, the computer program product being embodied in a tangible computer readable storage medium and comprising computer instructions which when executed by a computer cause the computer to perform the steps of:

waiting for a buffer to fill to a prescribed depth with call data; and transmitting a next call data from the buffer to a destination with which the buffer is associated, once the buffer has filled to the prescribed depth;

wherein the prescribed depth comprises a prescribed number of units of call data, each unit occupying a corresponding location in the buffer.

* * * * *